(12) United States Patent
Song

(10) Patent No.: US 8,017,281 B2
(45) Date of Patent: Sep. 13, 2011

(54) MEMBRANE-ELECTRODE ASSEMBLY FOR FUEL CELL WITH CATALYST LAYER HAVING A FIRST AND A SECOND POROSITY

(75) Inventor: Min-Kyu Song, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1014 days.

(21) Appl. No.: 11/603,411

(22) Filed: Nov. 22, 2006

(65) Prior Publication Data
US 2007/0122684 A1 May 31, 2007

(30) Foreign Application Priority Data
Nov. 25, 2005 (KR) .................. 10-2005-0113685

(51) Int. Cl.
*H01M 4/02* (2006.01)
*H01M 4/04* (2006.01)
*H01M 4/88* (2006.01)

(52) U.S. Cl. ................ 429/523; 429/535; 502/101

(58) Field of Classification Search ............... None
See application file for complete search history.

(56) References Cited

U.S. PATENT DOCUMENTS

| | | | |
|---|---|---|---|
| 3,369,938 A * | 2/1968 | Kroeger et al. ............. 429/45 |
| 6,475,249 B1 | 11/2002 | Hsu et al. | |
| 6,645,660 B2 | 11/2003 | Datz et al. | |
| 6,723,464 B2 | 4/2004 | Tabata et al. | |
| 6,756,148 B2 | 6/2004 | Hojo et al. | |
| 2002/0090543 A1 * | 7/2002 | Okamoto ................ 429/44 |

* cited by examiner

*Primary Examiner* — Barbara Gilliam
*Assistant Examiner* — Kwang Han
(74) *Attorney, Agent, or Firm* — Knobbe, Martens, Olson & Bear LLP

(57) ABSTRACT

The membrane-electrode assembly for a fuel cell includes a polymer electrolyte membrane, and an anode and a cathode disposed on each side of the polymer electrolyte membrane and including a catalyst layer. The catalyst layer has a first catalyst layer that has a porosity of less than or equal to about 40% and is disposed to contact the polymer electrolyte membrane, and a second catalyst layer that has a porosity of more than or equal to about 50% and is disposed on the first catalyst layer.

9 Claims, 3 Drawing Sheets

MEMBRANE-ELECTRODE ASSEMBLY FOR FUEL CELL WITH CATALYST LAYER HAVING A FIRST AND A SECOND POROSITY

CROSS-REFERENCE TO RELATED APPLICATION

This application claims priority to and the benefit of Korean Patent Application No. 10-2005-00113685 filed in the Korean Intellectual Property Office on Nov. 25, 2005, the disclosure of which is incorporated herein by reference in its entirety.

BACKGROUND

1. Field of the Invention

The present invention relates to a fuel cell, and more particularly, a membrane-electrode assembly for a fuel cell.

2. Discussion of the Related Technology

A fuel cell is a power generation system for producing electrical energy through an electrochemical redox reaction of an oxidant and hydrogen in a hydrocarbon-based material such as methanol, ethanol, or natural gas. Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell is a clean energy source that is capable of replacing fossil fuels. It has advantages such as high power density and energy conversion efficiency, operability at room temperature, and being down-sized and tightly sealed. Therefore, it can be applicable to a wide array of fields such as non-polluting automobiles, electricity generation systems, and portable power sources for mobile equipment, military equipment, and the like.

The polymer electrolyte fuel cell has an advantage of a high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the polymer electrolyte fuel cell, but it has the advantages of easy handling of the liquid-type fuel, a low operation temperature, and no need for additional fuel reforming processors. Therefore, it has been acknowledged as an appropriate system for a portable power source for small and common electrical equipment. Such a fuel cell includes a stack composed of unit cells, and it produces various ranges of power output. Since it has a four to ten times higher energy density than a small lithium battery, it is has been highlighted as a small portable power source.

In the above-mentioned fuel cell system, the stack that generates electricity substantially includes several to scores of unit cells stacked adjacent to one another, and each unit cell is formed of a membrane-electrode assembly (MEA) and a separator (also referred to as a bipolar plate). The membrane-electrode assembly includes an anode (also referred to as a "fuel electrode" or an "oxidation electrode") and a cathode (also referred to as an "air electrode" or a "reduction electrode") that are separated by a polymer electrolyte membrane.

The membrane-electrode assembly is generally fabricated as follows: a microporous layer for uniform supply of a reactant is formed on a carbon paper as an electrode substrate; a catalyst layer is coated on a microporous layer to fabricate an electrode; and then the electrode is hot-pressed with an electrolyte membrane. The electrode substrate is uniform and thus is difficult to be assembled with a 25 µm-thick thin electrolyte membrane. Further, the above method has a problem that the catalyst utility efficiency is varied in accordance with a catalyst coating manner. Therefore, in order to use a thin electrolyte membrane and improve catalyst utility efficiency, there has been research into alternative methods such as a method where a catalyst layer coated on an inactive substrate such as polytetrafluoroethylene is hot-pressed with an electrolyte membrane.

The discussion in this section is to provide general background information, and does not constitute an admission of prior art.

SUMMARY

An aspect of the invention provides a membrane-electrode assembly for use in a fuel cell, which may comprise: an anode catalyst layer; a cathode catalyst layer; an electrolyte membrane placed between the anode catalyst layer and the cathode catalyst layer; and wherein at least one of the anode catalyst layer and the cathode catalyst layer comprises a first sub-layer and a second sub-layer, wherein the first sub-layer has a first porosity and the second sub-layer has a second porosity, wherein the second porosity is greater than the first porosity.

In the foregoing assembly, the second porosity may be equal to or greater than about 50%. The second porosity may be from about 50% to about 80%. The first porosity may be equal to or less than about 40%. The first porosity may be from about 5% to about 40%. A portion of the second sub-layer may have a porosity at least about 60%. A portion of the first sub-layer may have a porosity less than about 30%. The first sub-layer may have a first thickness and the second sub-layer has a second thickness, wherein the second thickness may be from about 25% to about 80% of the sum of the first thickness and the second thickness.

An aspect of the invention provides a fuel cell system which may comprise the foregoing membrane-electrode assembly.

An aspect of the invention provides a method of producing a membrane-electrode assembly for use in a fuel cell, which may comprise: providing a porous substrate comprising network of material defining pores; placing a catalyst material on the porous substrate, wherein at least part of the catalyst material migrates into the porous substrate and fills at least part of the pores; solidifying the catalyst material migrated into the porous substrate and remaining on the porous substrate, wherein the solidified catalyst material remaining on the porous substrate forms a first catalyst layer; forming an electrolyte layer on the first catalyst layer; and removing the porous substrate wherein the solidified catalyst material migrated into the porous substrate forms a second catalyst layer after removal of the porous substrate.

In the foregoing method, forming the electrolyte layer may comprise attaching a pre-formed electrolyte film onto a surface of the first catalyst layer. Removing may comprise substantially removing the network of material so as to form pores in the second catalyst layer where the network of material has occupied. The catalyst material may be in the form of slurry prior to solidifying.

Still in the foregoing method, the first catalyst layer may have a first porosity and the second catalyst layer has a second porosity, wherein the second porosity may be greater than the first porosity. The second porosity may be equal to or greater than about 50%. The second porosity may be from about 50% to about 80%. The first porosity may be equal to or less than about 40%. The first porosity may be from about 5% to about 40%. The porous substrate may comprise at least one selected from the group consisting of polytetrafluoroethylene, polyvinylidene fluoride, polyethylene, polypropylene, polyethylene terephthalate, polyester, and combinations thereof. The porous substrate may have a porosity equal to or less than about 70%. The catalyst material may have a viscosity ranging from about 1000 to about 100,000 cps.

One embodiment of the present invention provides a membrane-electrode assembly that can improve a catalyst utility efficiency. Another embodiment of the present invention provides a method for producing a membrane-electrode assembly. Yet another embodiment of the present invention provides a fuel cell system including the membrane-electrode assembly for a fuel cell.

According to one embodiment of the present invention, a membrane-electrode assembly for a fuel cell including a polymer electrolyte membrane, and an anode and a cathode disposed on each side of the polymer electrolyte membrane and including a catalyst layer, is provided. The catalyst layer includes a first catalyst layer that has a porosity of less than or equal to 40% and is disposed contacting the polymer electrolyte membrane, and a second catalyst layer that has a porosity of more than or equal to 50% and is disposed on the first catalyst layer.

According to another embodiment of the present invention, a method of producing a membrane-electrode assembly for a fuel cell is provided. The method includes coating a catalyst composition on a porous releasing film to form a catalyst layer; positioning the porous releasing film on a polymer electrolyte membrane and then subjected it to hot-pressing to transfer the catalyst layer to the polymer electrolyte membrane; and separating the porous releasing film from the catalyst layer transferred onto the polymer electrolyte membrane.

According to yet another embodiment of the present invention, a fuel cell system including an electricity generating element, a fuel supplier, and an oxidant supplier, is provided. The electricity generating element includes a membrane-electrode assembly and a separator positioned at each side of the membrane-electrode assembly. It generates electricity through oxidation of fuel and reduction of an oxidant. The fuel supplier plays a role of supplying the electricity generating element with a fuel including hydrogen, and the oxidant supplier plays a role of supplying the electricity generating element with an oxidant.

DETAILED DESCRIPTION OF EMBODIMENTS

An exemplary embodiment of the present invention will hereinafter be described in detail with reference to the accompanying drawings.

The membrane-electrode assembly according to one embodiment of the present invention improves catalyst efficiency of a catalyst layer. The membrane-electrode assembly includes a polymer electrolyte membrane, and an anode and a cathode disposed on each side of the polymer electrolyte membrane and including a catalyst layer. The catalyst layer includes a first catalyst layer that has a porosity of less than or equal to about 40% and is disposed contacting the polymer electrolyte membrane, and a second catalyst layer that has a porosity of more than or equal to about 50% and is disposed on the first catalyst layer. The second catalyst layer has a porosity of more than or equal to about 50%, and preferably about 50 to about 80%. Generally, the first catalyst layer has a porosity of about 40% or less, more specifically between about 5 and about 40%. The pores in the first layer may not be purposefully formed therein, but pores are spontaneously formed therein.

According to one embodiment of the present invention, the catalyst layer has a porosity of about 50% or more at the part where the material for the fuel cell such as the fuel and the oxidant and the reaction product are introduced and exhausted. This may facilitate introduction and exhaust of the reactant to improve the catalyst utility efficiency. In certain embodiments, a porosity of the second catalyst layer is about 45%, 50%, 55%, 60%, 65%, 70%, 75%, 80% or 85%. In some embodiments, the porosity of the second catalyst layer may be within a range defined by two of the foregoing porosities. In certain embodiments, a porosity of the first catalyst layer is about 5%, 10%, 15%, 20%, 25%, 30%, 35%, 40% or 45%. In some embodiments, the porosity of the second catalyst layer may be within a range defined by two of the foregoing porosities.

Figure 1:
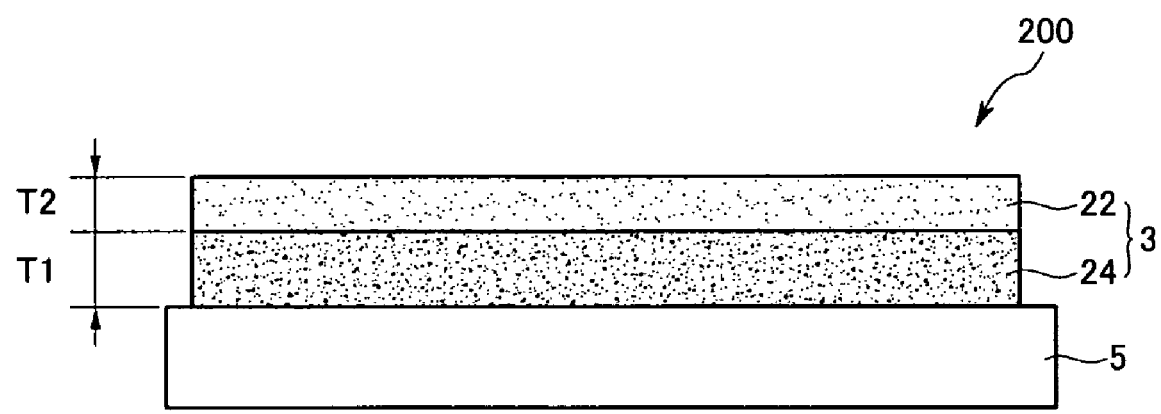
FIG. 1 is a schematic cross-sectional view showing a membrane-electrode assembly according to an embodiment of the present invention.

FIG. 1 is partial view showing a membrane-electrode assembly including a catalyst layer 3 in which a first catalyst layer 24 and a second catalyst layer 22 are formed on a polymer electrolyte membrane 5. In the illustrated in FIG. 1, the first layer 24 has a first thickness T1 and the second catalyst layer 22 has a second thickness T2, wherein the second thickness is from about 25% to about 80% of the sum of the first thickness and the second thickness.

Catalysts included in the catalyst layer may include any catalyst that can perform a fuel cell reaction, such as a platinum-based catalyst. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or one supported in a supporter. The supporter may include carbon-based materials such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon-based materials can be generally used.

When the catalyst includes a noble metal supported in on a carrier, it may include any one available in the market or one prepared by carrying a noble metal on a carrier. The process for supporting a noble metal on a carrier is well known to one having skill in the arts, so the details will be omitted from this detailed description.

The catalyst layer may further include a binder resin to improve its adherence and proton transference. The binder resin may be at least one proton conductive polymer selected from the group consisting of fluoro-based polymers such as perfluorosulfonate, polyamide-based polymers, polyetherbased polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. The H may be substituted with Na, K, Li, Cs, or tetrabutyl ammonium in an ion exchange group of the terminal end at the proton conductive polymer. When the H is substituted with Na in an ion exchange group at the terminal end of the proton conductive group, NaOH is used during preparation of a catalyst layer composition. When the H is substituted with tetrabutyl ammonium, tetrabutyl ammonium hydroxide is used. K, Li, or Cs can also be substituted by using appropriate compounds. A method of substituting H is known in the related art, and therefore is not described in detail.

The binder resin may be used singularly or as a mixture. Optionally, the binder resin may be used along with a non-conductive polymer to further improve adherence strength between a polymer electrolyte membrane and the catalyst layer. The use amount of the binder resin may be adjusted to its usage purpose.

Non-limiting examples of the non-conductive polymer include polytetrafluoroethylene (PTFE), tetrafluoroethylene-hexafluoropropylene (FEP) copolymers, tetrafluoroethylene-perfluoro alkyl vinylether (PFA) copolymers, ethylene/tetrafluoroethylene (ETFE), ethylenechlorotrifluoro-ethylene (ECTFE) copolymers, polyvinylidene fluoride, polyvinylidene fluoride-hexafluoropropylene (PVdF-HFP) copolymers, and combinations thereof.

In certain embodiments, on one side of the catalyst layer, an electrode substrate is disposed. The electrode substrate supports the electrode, and provides a path for diffusing and transferring fuel and an oxidant to the catalyst layer. In one embodiment, the electrode substrate is formed from a material such as carbon paper, carbon cloth, or carbon felt, or a metal cloth that includes a metal film formed on a surface of porous cloth film or a cloth composed of polymer fibers, but the electrode substrate is not limited thereto.

The electrode substrate may include water-repellent fluoro-based resins to prevent the deterioration of diffusion efficiency due to water generated during the operation of a fuel cell. The fluoro-based resin may include polytetrafluoroethylene, polyvinylidene fluoride, polyhexafluoropropylene, polyperfluoroalkylvinylether, polyperfluorosulfonylfluoride alkoxyvinyl ether, fluorinated ethylene propylene, polychlorotrifluoroethylene, or a copolymer thereof.

In an embodiment, a microporous layer (MPL) can be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoroethylene, polyvinylidene-fluoride, polyhexafluoropropylene, polyperfluoro alkylvinylether, polyperfluorosulfonylfluoride, alkoxyvinyl ether, polyvinylalcohol, cellulose acetate, or copolymers thereof. The solvent may include, but is not limited to, an alcohol such as ethanol, isopropylalcohol, n-propylalcohol, butanol, and so on, water, dimethyl acetamide, dimethyl sulfoxide, or N-methylpyrrolidone. The coating method may include, but is not limited to, screen printing, spray coating, doctor blade methods, gravure coating, dip coating, silk screening, painting, and so on, depending on the viscosity of the composition.

In some embodiments, the polymer electrolyte membrane includes a highly proton conductive polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, polyamide-based polymers, polyetherimide-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole). The H may be substituted with Na, K, Li, Cs, or tetrabutyl ammonium in a proton conductive group of the proton conductive polymer. When the H is substituted with Na in an ion exchange group at the terminal end of the proton conductive group, NaOH is used. When the H is substituted with tetrabutyl ammonium, tetrabutyl ammonium hydroxide is used. K, Li, or Cs can also be substituted by using appropriate compounds. A method of substituting H is known in the related art, and therefore is not described in detail.

Figure 2:
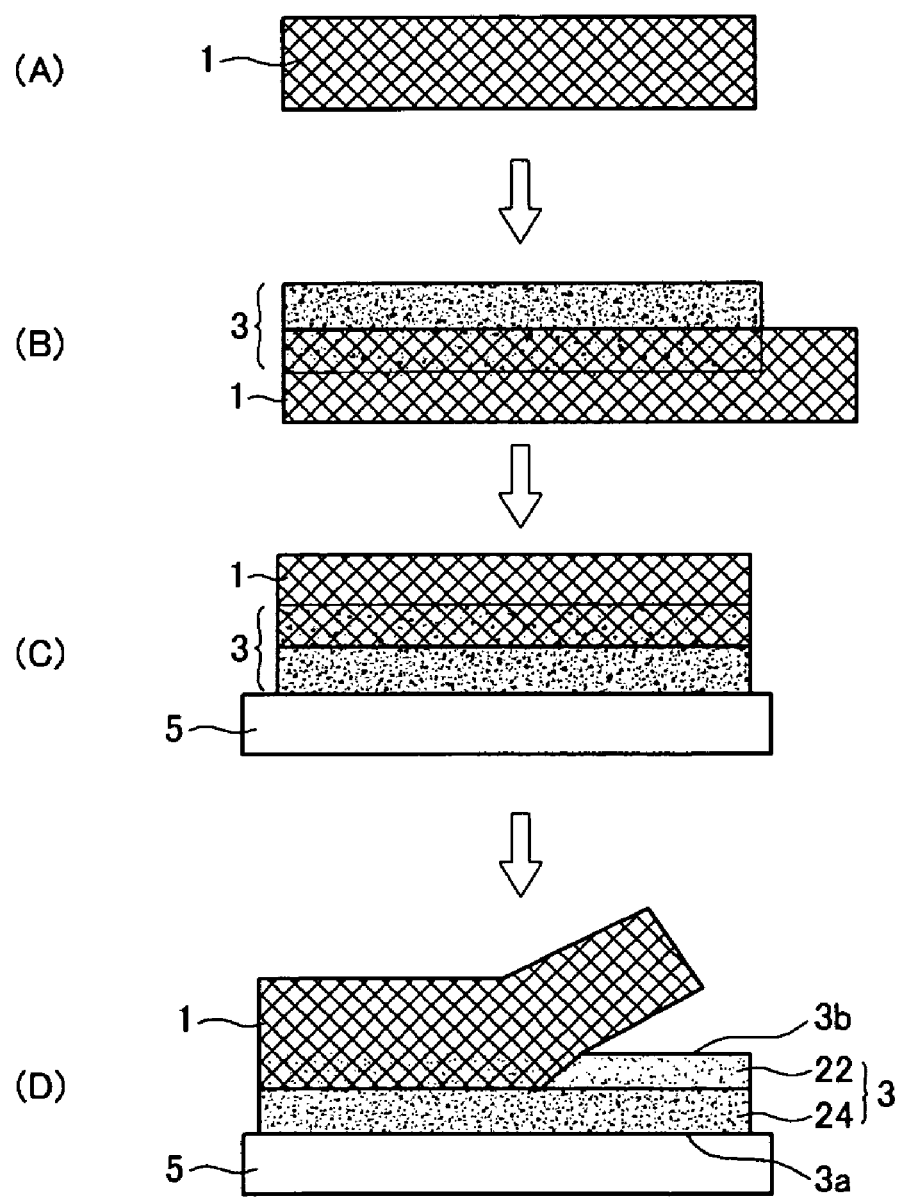
FIG. 2 is a flow chart showing a producing process of the membrane-electrode assembly according to one embodiment of the present invention.

Such membrane-electrode assembly for the fuel cell mentioned above may be prepared by any process as long as the process can provide each of the first and second catalyst layers with the predetermined range of porosity. The manufacturing method according to the illustrated embodiment will be described referring to FIG. 2.

In certain embodiments, a porous releasing film or porous substrate 1 is to be prepared (FIG. 2A). The porous releasing film 1 has a porosity of about 50% or more. In and embodiment, the porosity of the porous releasing film may be between 50 and 80%. In some embodiments, the porous releasing film preferably has a thickness of about 50 to about 100 μm. The porous releasing film includes a polymer that does not react with a catalyst, and representative examples thereof include polytetrafluoroethylene, polyvinylidene fluoride, polyethylene, polypropylene, polyethylene terephthalate, polyester, and the like.

In an embodiments, the catalyst layer 3 is prepared by coating a catalyst composition or material on a porous releasing film 1 (FIG. 2B). During the coating process, the catalyst composition layer is formed only within the certain depth in a thickness direction on one surface of the releasing film. In order to achieve the above, the viscosity of the catalyst composition may be controlled. In some embodiment, the viscosity of the catalyst composition is preferably between about 1000 and about 100,000 cps.

Resultantly, when the coating process in which the composition is coated and dried is completed, the dense catalyst layer in which pores are not present is provided on the surface of the porous releasing film 1 as shown in FIG. 2B. However, the catalyst composition is permeated or migrates into some parts inside of the porous releasing film and dried so that the porous catalyst layer is provided. In this specification, the, reference number 3 in FIG. 2B denotes a catalyst layer including all catalysts present inside and on the surface of the porous releasing film.

The catalyst composition comprises a catalyst, a binder, an agent for increasing viscosity, and an organic solvent. The catalyst composition preferably includes a binder at about 10 to about 25% by weight and an agent for increasing viscosity at about 75 to about 150% by weight based on 100% by weight of the catalyst, and in an embodiment, a binder at about 10 to about 20% by weight and the agent for increasing viscosity at about 70 to about 140% by weight. In this case, the adding amount of the solvent is suitably the same as that of the catalyst. Further, the binder and catalyst may include components as mentioned above.

The agent for increasing viscosity acts to prevent the decrease of the structural stability of the membrane-electrode assembly by permeating the solvent included in the composition for the catalyst layer into the polymer electrolyte membrane and expanding the polymer electrolyte membrane when the catalyst layer is directly formed on the polymer electrolyte membrane. However, the agent for increasing viscosity is chemically dissolved due to the redox reaction upon driving the fuel cell to deteriorate the ion conductivity or the electron conductivity of the catalyst layer when the agent for increasing viscosity remains in the catalyst layer. Thereby, it may be preferable to remove the agent for increasing viscosity by the acid-treatment after obtaining the catalyst layer so that it does not remain in the catalyst layer of the resultant membrane-electrode assembly.

The agent for increasing viscosity may be selected from the group consisting of glycerol, glycols such as dipropylene glycol or diethylene glycol, ethyl cellulose, hydroxypropyl cellulose, methyl cellulose, castor oil derivatives, and combinations thereof. The solvent may include, but is not limited to, water, alcohol such as methanol, ethanol, and isopropylalcohol, N-methylpyrrolidone, dimethylacetamide, dimethylsulfoxide, tetrahydrofuran, acetone, or a mixture thereof.

In the illustrated embodiment, the polymer electrolyte membrane 5 is positioned on a catalyst layer 3 formed on the porous releasing film 1, and is hot-pressed to transfer the catalyst layer to the polymer electrolyte membrane (FIG. 1C). The hot-pressing process is preferably carried out at a temperature ranging from about 150 to about 250° C., and a pressure ranging from about 100 to about 3000 psi.

In addition, H in the proton conductive group in the proton conductive polymer of the polymer electrolyte membrane and the ionomer binder of the catalyst layer composition is substituted with Na, K, Li, Cs, or tetrabutyl ammonium, so that the thermal stability may be improved. Thus, the ionomer binder and the proton conductive polymer may not be deteriorated and thus the life-span of the fuel cell may not decrease. When it is substituted with Na, K, Li, Cs or tetrabutyl ammonium, the catalyst layer is treated with acids, and thus the proton form ($H^+$ form) polymer electrolyte membrane is obtained by the acid treatment. In the hot-pressing process, the pressure is controlled in order to provide suitable conditions for the electro-conductivity, ion conductivity, and mass transport.

When the pressing process is completed, the porous releasing film 1 is removed from the catalyst layer transferred in the polymer electrolyte membrane (FIG. 1D). After the process, a product is obtained that one surface of the polymer electrolyte membrane is attached with a catalyst layer. Then, when the other surface thereof is subjected to the same process, a membrane-electrode assembly is obtained in which both surfaces of the polymer electrolyte membrane are formed with catalyst layers.

The surface 3a of the catalyst layer directly contacted with the polymer electrolyte membrane is the area where the catalyst is not overlapped with the porous releasing film. Thereby, the first catalyst layer 24 having pores is provided thereon, and the opposite surface 3b that is opposite to the surface 3a is provided with a second catalyst layer 22 in which pores are formed on the porous area. The porous area is formed by permeating the catalyst into the pore of the porous releasing film.

When the ionomer binder and the polymer electrolyte membrane include one in which H in the hydrogen ion conductive group is substituted with Na, K, Li, Cs, or tetrabutyl ammonium, Na, K, Li, Cs, or tetrabutyl ammonium is acid-treated and substituted to a proton form ($H^+$ form). The acid treatment includes treating the membrane-electrode assembly with the acid at about 80 to about 100° C., and washing with water. The acid may include sulfuric acid, but it is not limited thereto. Generally it includes 1M sulfuric acid aqueous solution.

According to an embodiment of the present invention, the manufacturing method includes spraying a first catalyst composition on a releasing film to provide a second catalyst layer having a porosity of about 50% or more, and coating a second coating composition on the second catalyst layer to provide a first catalyst layer having a porosity of about 40% or less. The first and second catalyst compositions include the same materials as in the above described embodiment. The coating process includes a doctor blade method or a printing method such as screen printing. The releasing film includes a polymer that does not react with a catalyst, such as polytetrafluoroethylene, polyvinylidene fluoride, polyethylene, polypropylene, polyethylene terephthalate, polyester, or the like.

Subsequently, a polymer electrolyte membrane is disposed on the porous releasing film including the catalyst layer in which the first and second catalyst layers are included. Then it is hot-pressed to transfer the catalyst layer to the polymer electrolyte membrane to provide a membrane-electrode assembly. The hot-pressing process may be carried out as in the above described embodiment, so a detailed description thereof is omitted.

According to another embodiment, the producing method is provided, including coating a catalyst composition on a polymer electrolyte membrane to provide a first catalyst layer having a porosity of about 40% or less; and spraying the catalyst composition on the first catalyst layer to provide a second catalyst layer having a porosity of about 50% or more. The catalyst composition may include any one as those of the above mentioned embodiment. The coating process may include a doctor blade or printing technique.

A fuel cell system according to an embodiment of the present invention including the membrane-electrode assembly includes at least one electricity generating element, a fuel supplier, and an oxidant supplier. The electricity generating element includes a membrane-electrode assembly and separators (also referred to as bipolar plates) positioned at both sides of the membrane-electrode assembly. It generates electricity through the fuel oxidation and the oxidation reduction. The fuel supplier plays a role of supplying the electricity generating element with fuel including hydrogen, and the oxidant supplier plays a role of supplying the electricity generating element with an oxidant. The oxidant includes oxygen or air. The fuel includes a liquid or gaseous hydrocarbon-based fuel such as methanol, ethanol, propanol, butanol, or natural gas, as well as hydrogen.

Figure 3:
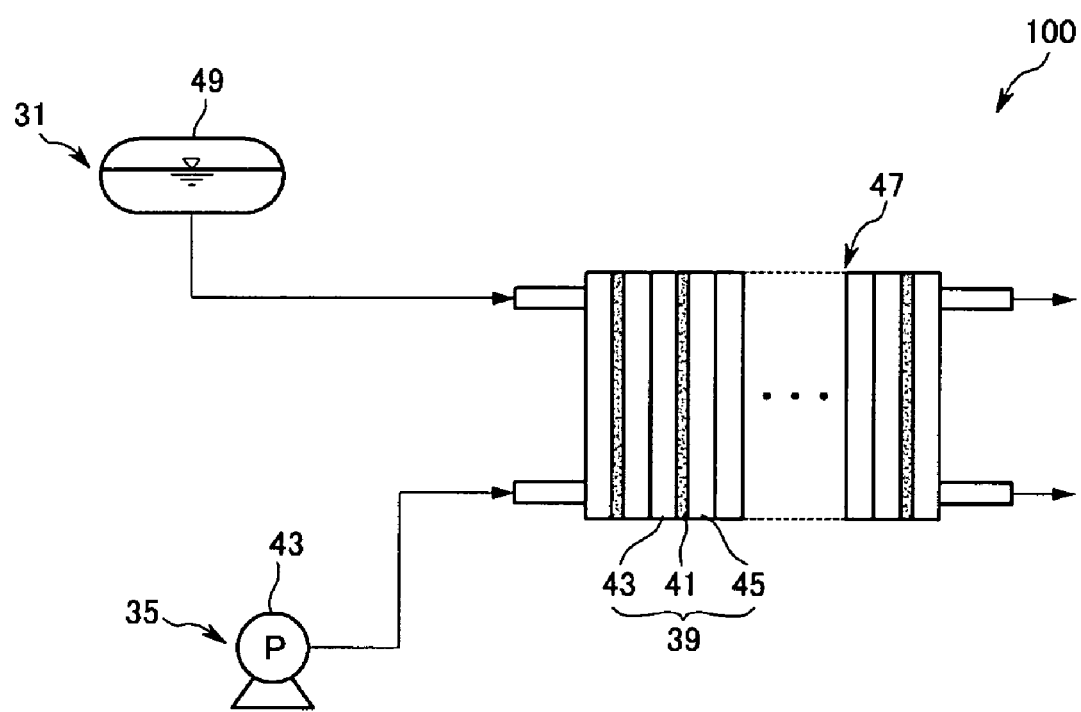
FIG. 3 is a schematic diagram showing the structure of a fuel cell system according to another embodiment of the present invention.

FIG. 3 shows a schematic structure of a fuel cell system 100 that will be described in detail with reference to this accompanying drawing, as follows. FIG. 3 illustrates a fuel cell system wherein fuel and an oxidant are provided to the electricity generating element 39 through pumps 43 and 49, although not limited to such structures. The fuel cell system according to an embodiment of the present invention alternately includes a structure wherein fuel and an oxidant are provided in a diffusion manner.

A fuel cell system 100 includes at least one electricity generating element 39 that generates electrical energy through an electrochemical reaction of fuel and an oxidant, a fuel supplier 31 for supplying the electricity generating element 39 with fuel, and an oxidant supplier 35 for supplying the electricity generating element 39 with the oxidant. In addition, the fuel supplier 31 is equipped with a tank 49 that stores fuel. The oxidant supplier 35, which supplies the electricity generating element 39 with an oxidant, is equipped with at least one pump 43 for supplying an oxidant with a predetermined pumping power. The electricity generating element 39 includes a membrane-electrode assembly 41 that oxidizes fuel and reduces an oxidant, and separators 43 and 45 that are respectively positioned at opposite sides of the membrane-electrode assembly and supply fuel, and an oxidant, respectively. At least one electricity generating element 39 constitutes a stack 47.

The following examples illustrate embodiments of the present invention in more detail. However, it is understood that the present invention is not limited by these examples.

Example 1

5.0 g each of Pt—Ru black (Johnson Matthey, HiSpec 6000) anode catalyst and Pt black (Johnson Matthey, HiSpec 100) cathode catalyst were wet in 5.0 g deionized water, and 10.0 g of 5 wt % NAFION/$H_2O$/2-propanol (Solution Technology Inc.) and 0.5 g of 1M tetrabutyl ammonium hydroxide/methanol (Aldrich) were added thereto and mechanically agitated at room temperature for 6 hours to provide an anode catalyst slurry and a cathode catalyst slurry, respectively. Then, 10 g of dipropylene glycol was added and mechanically agitated at room temperature for 6 hours to provide a cathode catalyst slurry. H of NAFION was substituted with tetrabutyl ammonium to provide a tetrabutyl ammonium type of NAFION.

The anode catalyst slurry and the cathode catalyst slurry were respectively screen-printed at 5×5 $cm^2$ on porous polytetrafluoroethylene releasing films (Tetratex #3102) having a porosity of 60% and a thickness of 75 μm, then they were dried at 60° C. for 12 hours under a nitrogen atmosphere. From the process, a cathode catalyst layer and an anode catalyst layer were provided on each of the polytetrafluoroethylene films. The catalysts were present at a thickness of up to 40 μm. The final catalyst loading was controlled within 3 mg/$cm^2$ for each case.

Subsequently, a sodium foam perfluorosulfonate polymer electrolyte membrane (Nat form NAFION 115) was disposed between two polytetrafluoroethylene film catalyst layers each of which was formed with the anode catalyst layer and the cathode catalyst layer and hot-pressed at 190° C. and under a pressure of 500 psi for 3 minutes. Thereby, the polymer electrolyte membrane was attached to the catalyst layer.

Subsequently, the porous polytetrafluoroethylene releasing film was removed and the catalyst-coated polymer electrolyte membrane was treated in 1 M sulfuric acid aqueous solution at 100° C. for 1 hour. Perfluorosulfonate was substituted to proton form ($H^+$ form), then treated in deionized water at 100° C. for one hour, and washed and dried at room temperature. At this time, the first catalyst layer contacted with the polymer electrolyte membrane had a porosity of 40%, and a second catalyst layer formed on the first catalyst had a porosity of 60%.

A commercial electrode substrate (gas diffusion layer, SGL Carbon, 31BC) formed with a microporous layer was attached to both surface of the catalyst layer at a temperature of 130° C. and a pressure of 500 psi to provide a membrane-electrode assembly for a fuel cell in which the anode and the cathode were formed on both surface of a polymer electrolyte membrane.

The membrane-electrode assembly was interposed between two sheets of gaskets, and then the membrane-electrode assembly with gaskets at both sides was interposed between two separators equipped with a flow channel and a cooling channel with a predetermined shape, and was then compressed between copper end plates to fabricate a unit cell.

1 M methanol and ambient air were introduced with stoichiometry (methanol supplying amount to anode/ambient air supplying amount to cathode, the predicted value for electrochemical reaction) of 3.0/3.0 while keeping the provided unit cell at 70° C. Then, current density and power density were measured at a driving voltage of 4.0 V.

Example 2

A unit cell was fabricated by the same process as in Example 1, except that a porous polytetrafluoroethylene releasing film having a porosity of 50% was used.

Example 3

A unit cell was fabricated by the same process as in Example 1, except that a porous polytetrafluoroethylene releasing film having a porosity of 80% was used.

Example 4

Each polytetrafluoroethylene releasing film was spray-coated with the anode catalyst slurry and the cathode catalyst slurry used in Example 1 and dried at 60° C., under a nitrogen atmosphere for 12 hours to provide each with a second catalyst layer having a porosity of 60%.

Each of the second catalyst layers were screen-coated with the anode catalyst slurry and the cathode catalyst slurry used in Example 1, and dried at 60° C., under a nitrogen atmosphere for 12 hours to provide a first catalyst on one surface of the second catalyst layer. Solvent was volatilized while drying the provided first catalyst layer to provide pores spontaneously.

A sodium form of perfluorosulfonate polymer electrolyte membrane ($Na^+$-form NAFION 115) was disposed between two polytetrafluoroethylene releasing films each of which was formed with the anode catalyst layer and the cathode catalyst layer. The anode and the cathode catalyst layers included the first catalyst layer and the second catalyst layer. Then, it was hot-pressed at 190° C. under a pressure of 500 psi for 3 minutes to attach the polymer electrolyte membrane with the catalyst layer.

After removing the polytetrafluoroethylene releasing film, the catalyst-coated polymer electrolyte membrane was treated in 1 M sulfuric acid aqueous solution at 100° C. for 1 hour to substitute the perfluorosulfonate to a proton form ($H^+$ form). Then, it was treated in deionized water at 100° C. for 1 hour, washed, and dried at room temperature.

A commercial electrode substrate (gas diffusion layer, SGL Carbon, 31BC) formed with the microporous layer was attached onto both surface of the catalyst layer at 130° C., under the pressure of 500 psi to provide a membrane-electrode assembly for a fuel cell in which the both surfaces of the polymer electrolyte membrane were formed with the anode electrode and the cathode electrode.

The membrane-electrode assembly was interposed between a gasket, and also interposed between two separators equipped with a flow channel and a cooling channel with a predetermined shape, and was then compressed between copper end plates to fabricate a unit cell.

1 M methanol and the ambient air were introduced while keeping the unit cell at 70° C. with stoichiometry (supplying amount of methanol to anode/supplying amount of the ambient air into the cathode, predicted value for electrochemical reaction) of 3.0/3.0. The current density and the power density were determined at the driving voltage of 0.4 V.

Example 5

Both surfaces of a sodium form of perfluorosulfonate polymer electrolyte membrane ($Na^+$ form of NAFION 115) were spray-coated with the anode catalyst slurry and the cathode catalyst slurry used in Example 1 and dried at 60° C. under a nitrogen atmosphere for 12 hours to provide a second catalyst layer.

Each the second catalyst layers were screen-coated with the anode catalyst slurry and the cathode catalyst slurry used in Example 1, and dried at 60° C. under a nitrogen atmosphere for 12 to provide a first catalyst on one surface of the second catalyst layer. The provided second catalyst layer had a porosity of 60%.

After removing the polytetrafluoroethylene releasing film, the catalyst-coated polymer electrolyte membrane was treated in 1M sulfuric acid aqueous solution at 100° C. for 1 hour to substitute the perfluorosulfonate to a proton form ($H^+$ form). Then, it was treated in the deionized water at 100° C. for 1 hour, washed, and dried at room temperature.

A commercial electrode substrate (gas diffusion layer, SGL Carbon, 31 BC) formed with the microporous layer was attached onto both surfaces of the catalyst layer at 130° C., under a pressure of 500 psi to provide a membrane-electrode assembly for a fuel cell in which both surfaces of the polymer electrolyte membrane were formed with the anode electrode and the cathode electrode.

The membrane-electrode assembly was interposed between a gasket, and also interposed between two separators equipped with a flow channel and a cooling channel with a predetermined shape, and was then compressed between copper end plates to fabricate a unit cell.

1M methanol and the ambient air were introduced while keeping the unit cell at 70° C. with stoichiometry (supplying amount of methanol to anode/supplying amount of the ambient air into the cathode, predicted value for electrochemical reaction) of 3.0/3.0. There current density and the power density were determined at the driving voltage of 0.4 V.

Example 6

A unit cell was provided in accordance with the same process as in Example 1, except that a nonporous polytetrafluoroethylene release film was used.

Example 7

A unit cell was provided in accordance with the same process as in Example 1, except that the anode catalyst slurry and the cathode catalyst slurry of Example 1 were printed in the same amount as that of Example 1 on the 31 BC electrode substrate (diffusion layer) manufactured by SGL carbon Inc. and dried. Then it was hot-pressed on a perfluorosulfonate polymer electrolyte membrane (NAFION 115) at 130° C. and 500 psi for 3 minutes to provide a membrane-electrode assembly.

Example 8

A unit cell was provided in accordance with the same process as in Example 1, except that an ELAT electrode substrate including an ELAT catalyst layer (manufactured by E-Tek Inc.) formed with the anode and the cathode catalyst layers was hot-pressed on the perfluorosulfonate polymer electrolyte membrane (NAFION 115) under the same conditions to provide a membrane-electrode assembly.

The power densities of the fuel cells according to Example 1 and Comparative Examples 1 to 3 were measured at 70° C., and the results are shown in Table 1.

TABLE 1

| | Example 1 | Example 6 | Example 7 | Example 8 |
|---|---|---|---|---|
| Power density at 0.4 V (mW/cm$^2$) | 131 | 122 | 101 | 96 |

As shown in Table 1, the unit cell according to Example 1 had a higher driving voltage compared to those of Examples 6, 7, and 8 under the same driving conditions. Thereby, it is confirmed that the unit cell according to Example 1 had excellent power characteristics. Further, as the power densities for Examples 2 to 5 were similar to that of Example 1, they also had excellent power characteristics. As described above, the membrane-electrode assembly according to one embodiment of the present invention can improve catalyst utility efficiency.

While embodiments of this invention has been described, it is to be understood that the invention is not limited to the disclosed embodiments, but, on the contrary, is intended to cover various modifications and equivalent arrangements included within the spirit and scope of the appended claims.

What is claimed is:

1. A membrane-electrode assembly for use in a fuel cell, comprising:
    an anode comprising an anode catalyst layer;
    a cathode comprising a cathode catalyst layer; and
    an electrolyte membrane disposed between the anode and the cathode,
    wherein of the anode catalyst layer comprises a first catalyst layer and a second catalyst layer,
    wherein the first catalyst layer is disposed between the second catalyst layer and the electrolyte membrane,
    wherein the first catalyst layer has a first porosity and the second catalyst layer has a second porosity, and
    wherein the second porosity is greater than the first porosity.

2. The assembly of claim 1, wherein the second porosity is equal to or greater than about 50%.

3. The assembly of claim 1, wherein the second porosity is from about 50% to about 80%.

4. The assembly of claim 1, wherein the first porosity is equal to or less than about 40%.

5. The assembly of claim 1, wherein the first porosity is from about 5% to about 40%.

6. The assembly of claim 1, wherein a portion of the second catalyst layer has a porosity at least about 60%.

7. The assembly of claim 1, wherein a portion of the first catalyst layer has a porosity less than about 30%.

8. The assembly of claim 1, wherein the first catalyst layer has a first thickness and the second catalyst layer has a second thickness, wherein the second thickness is from about 25% to about 80% of the sum of the first thickness and the second thickness.

9. A fuel cell system comprising the membrane-electrode assembly of claim 1.

* * * * *

UNITED STATES PATENT AND TRADEMARK OFFICE
CERTIFICATE OF CORRECTION

Page 1 of 1

PATENT NO. : 8,017,281 B2
APPLICATION NO. : 11/603411
DATED : September 13, 2011
INVENTOR(S) : Min-Kyu Song It is certified that error appears in the above-identified patent and that said Letters Patent is hereby corrected as shown below:

Column 6, Line 46, Change "and" to --an--.

Column 7, Line 44, Change "(FIG. 1C)." to --(FIG. 2C).--.

Column 7, Line 64, Change "(FIG. 1D)." to --(FIG. 2D).--.

Column 9, Line 57, Change "(Nat" to --($Na^+$- --.

Column 11, Line 40, Change "31 BC)" to --31BC)--.

Column 11, Line 55, Change "There" to --Their--.

Column 12, Line 2, Change "31 BC)" to --31BC)--.

(Claims), Column 12, Line 52, In Claim 1, after "wherein" delete "of".

Signed and Sealed this
Sixth Day of March, 2012

David J. Kappos
*Director of the United States Patent and Trademark Office*